Nov. 25, 1952

G. W. GILES ET AL 2,619,260

FERTILIZER DISTRIBUTOR

Filed Feb. 8, 1946

Inventor
GEORGE W. GILES
RASSIE E. WICKER

By Warley L. Parrott
Attorney

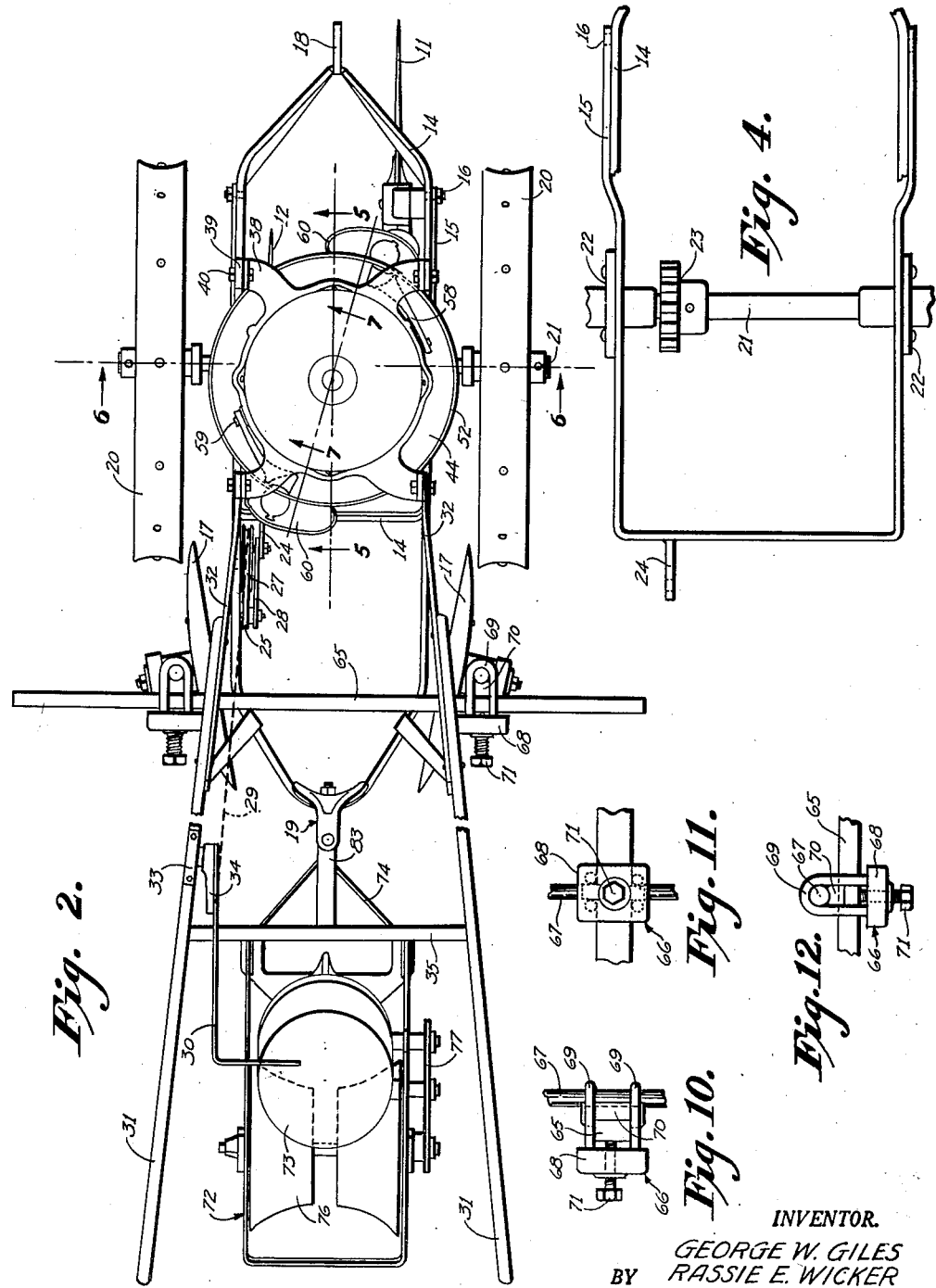

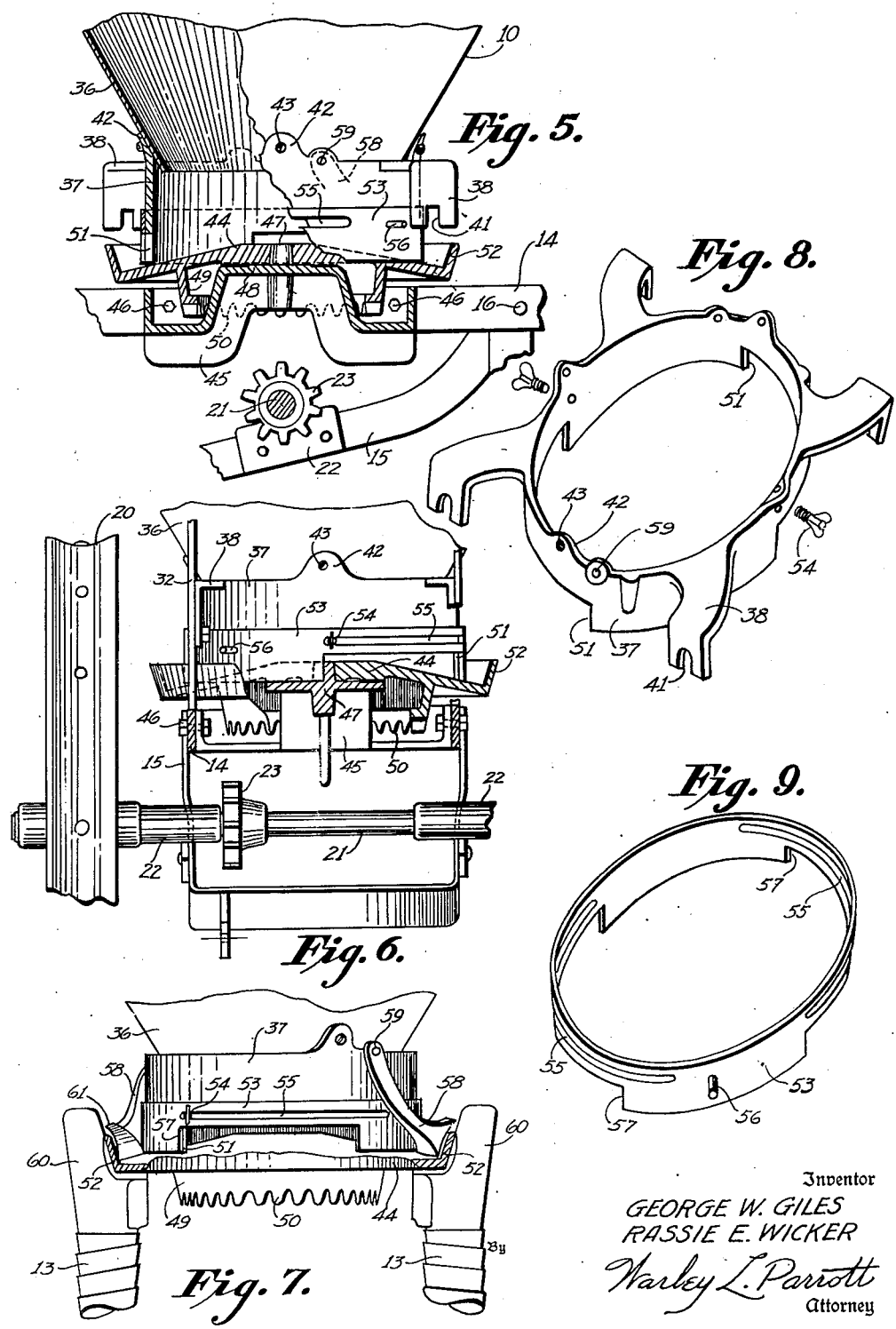

Patented Nov. 25, 1952

2,619,260

UNITED STATES PATENT OFFICE 2,619,260

FERTILIZER DISTRIBUTOR

George W. Giles, Raleigh, and Rassie E. Wicker, Pinehurst, N. C., assignors, by direct and mesne assignments, to General Foundry and Machine Company, a corporation of North Carolina Application February 8, 1946, Serial No. 646,248

6 Claims. (Cl. 222—177)

1

This invention relates to agricultural implements, and more particularly to a fertilizer distributor adapted for use as a separate unit or in combination with planters.

The fertilizer distributor of our invention is arranged with a simple and light-weight construction such as to allow it to be pulled by a single draft animal and requiring only one person to operate it either alone or in combination with a planter. An important feature of our fertilizer distributor is an improved arrangement for feed regulation of the fertilizer making it possible to control the rate at which fertilizer is fed effectively over a wide range.

Another important feature is the provision of a supporting frame structure including a hopper support frame and a running gear frame pivotally connected to the support frame, and associated with means for manipulating the frame structure so that the fertilizer distributing mechanism may be easily shifted to inoperative position without requiring the use of complicated clutch mechanisms and the like.

Our fertilizer distributor also includes greatly simplified means for mounting earth working elements as part of the equipment which function to build a bed for a subsequent planting operation, and further incorporates a unique coupling means for use where the fertilizer distributor is to be employed in combination with a planter. This coupling means comprises a hinge assembly having a pivot axis oriented with an inclination off of vertical. This inclination has the effect of disposing the fertilizer distributor in combination with a planter so that the units tend to travel in line but are adapted to pivot at the point of coupling and maintain the path of operation of the planter centrally disposed with respect to the operation of the fertilizer distributor when the fertilizer distributor is directed in a curved path. It will be recognized that this latter feature is of particular importance in connection with the currently increasing practice of contour farming.

Our invention is illustrated in the accompanying drawing in which:

Fig. 2 is a corresponding top plan view with the upper supply portion of the hopper assembly removed;

2

Fig. 4 is a plan view illustrating the arrangement of the running gear frame;

Fig. 5 is a fragmentary detail of the hopper assembly oriented substantially on the line 5—5 of Fig. 2;

Fig. 6 is a corresponding detail oriented substantially on the line 6—6 of Fig. 2;

Fig. 7 is a further similar detail taken substantially on the line 7—7 of Fig. 2;

Fig. 8 is a perspective view of the lower hopper support portion;

Fig. 9 is a corresponding perspective view of the shiftable feed regulating bands;

Fig. 10 is a side view partly in section of the securing means for the earth working elements;

Fig. 11 is a corresponding left face view;

Fig. 12 is a corresponding top plan view; and

Figure 13:
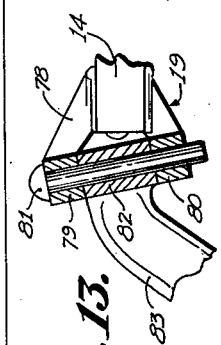

Fig. 13 is a fragmentary detail, partly in section, of the arrangement of the coupling means for attaching the planter unit to the fertilizer distributor of the present invention.

Figure 1:
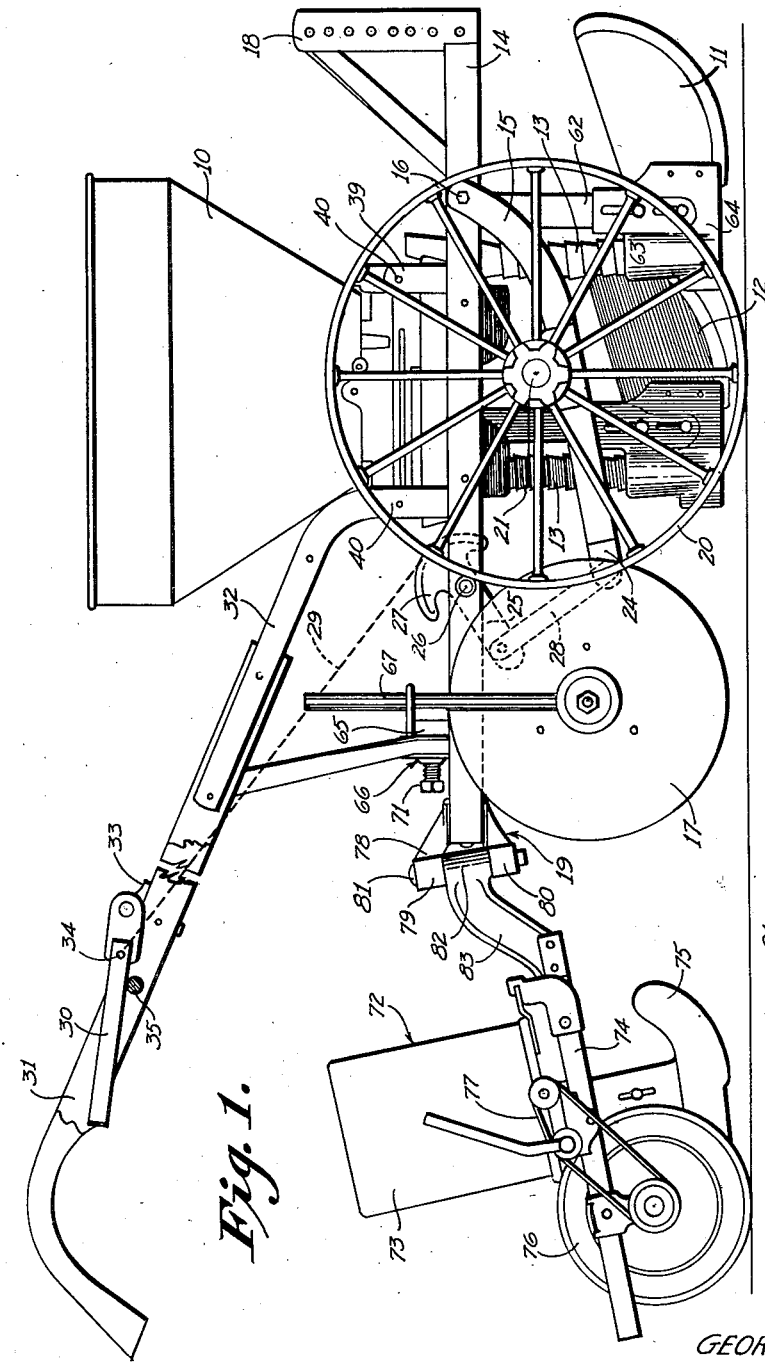
Fig. 1 is a side elevation of the fertilizer distributor of our invention including an illustration of the manner of association with a planter.

As illustrated in Figs. 1 and 2 of the drawings, the fertilizer distributor of the present invention comprises generally a hopper assembly 10 arranged in association with furrow opening elements 11 and 12 and depositing legs 13 which are disposed rearwardly of the furrow opening elements 11 and 12. These furrow opening elements 11 and 12 are transversely positioned to open spaced furrows, and the hopper assembly 10 is adapted to feed fertilizer to the depositing legs 13 for deposit in the furrows opened by the elements 11 and 12.

The supporting frame structure for the fertilizer distributor includes a hopper support frame 14 and a running gear frame 15 which is pivotally connected as at 16 to the hopper support frame 14. The hopper assembly 10, furrow opening elements 11 and 12, and distributing legs 13 are all carried on the hopper support frame 14. Earth working elements 17 are also arranged on support frame 14, which function to cover the furrows opened by elements 11 and 12 and to throw earth inwardly to build a bed for a subsequent planting operation.

The hopper support frame 14 is formed with transversely spaced longitudinal portions which converge inwardly at each end to a more or less pointed junction (see Fig. 2). At the forward end of the support frame 14, a hitch bar 18 is provided for coupling the equipment to a draft animal or the like. The hitch bar 18 is formed with a suitably spaced series of apertures as shown for proper coupling adjustment. At the rear end of support frame 14, a hinge assembly as indicated at 19 is arranged to provide a coupling means for attaching a planter for use in combination with the fertilizer distributor.

The running gear frame 15 curves downwardly from the pivoted connection at 16 with support frame 14 to form a generally rectangular underlying frame structure (see Fig. 4). The running gear for the fertilizer distributor, which includes wheels 20 and axle 21, is arranged in relation to this frame 15, the axle 21 being journaled in bearings 22 carried by the frame.

The running gear also comprises a gear member 23 fixed on axle 21 to provide a driving means, as is described more in detail below, for the hopper assembly 10. At the rear of the running gear frame 15 an extending bracket 24 is disposed for connection with a manipulating linkage by which the frame 15 may be pivoted with respect to the support frame 14 to engage and disengage gear member 23 with the hopper assembly 10 at will. This manipulating linkage (see Fig. 1) comprises a link member 25 pivoted on hopper support frame 14 as at 26 and having a segment portion 27. A second link member 28 connects link member 25 with the previously mentioned extending bracket 24 on running gear frame 15.

It will be seen that if link member 25 is pivoted so that segment portion 27 moves in a clockwise direction then the rear end of running gear frame 15 will be drawn toward support frame 14. And as this movement of frames 14 and 15 will take place in relation to axle 21, due to the fact that wheels 20 rest on the ground and will remain stationary, gear 23 on axle 21 will be presented to hopper assembly 10; and, as will be pointed out more in detail below, driving connection between gear 23 and hopper assembly 10 will be effected under these conditions. Conversely, by counter-clockwise movement of segment portion 27, running gear frame 15 will be pivoted away from support frame 14, and the driving connection between gear 23 and hopper assembly 10 will be disengaged.

Means for controlling the movement of segment portion 27 is provided through a flexible connection 29 to a lifting lever 30. The lifting lever 30 is mounted on one of the handles 31 for the fertilizer distributor which extend from suitable bracket supports 32 arranged on support frame 14. The lifting lever 30 is pivoted in a bearing mounting as at 33 on handle 31, and the flexible connection 29 runs to a point of attachment as at 34 on lifting lever 30. The segment portion 27 is shown in Fig. 1 shifted to the full extent in counter-clockwise direction so that running gear frame 15 is fully spaced apart from support frame 14 and gear member 23 is consequently disengaged from hopper assembly 10. For this position of segment portion 27 lifting lever 30 is pivoted in full upward position to effect the necessary extension of flexible connection 29 from segment portion 27. In this position it will be noted that the line of pull on flexible connection 29 passes under the pivot point for lifting lever 30 so as to lock the lever 30 in this position on the rest provided by cross brace 35 running between handles 31.

To engage gear 23 with hopper assembly 10, lifting lever 30 is shifted clockwise around the pivot point in bracket 33 to release the pull on flexible connections 29 and allow segment portion 27 to pivot clockwise of frame 14. The weight of frame 14 and the elements which it carries will require segment portion 27 to pivot in this manner when the pull on flexible connection 29 is released, with the result that link members 25 and 28 will be shifted to draw support frame 14 and running gear frame 15 together and present gear 23 to hopper assembly 10 as previously mentioned.

The flexible connection indicated at 29 in the drawing may be a chain or any other suitable means for forming a flexible linkage between segment portion 27 and lifting lever 30. This connection is made flexible because when the supporting frame structure is manipulated to present gear 23 to hopper assembly 10, the effect is really to lower support frame 14 in relation to axle 21 which remains stationary because wheels 20 are resting on the ground. Now as support frame 14 is lowered, furrow opening elements 11 and 12 and earth working elements 17 will also be lowered. But as these elements are disposed to enter the ground when the fertilizer distributor is in operative position, it will be seen that they will rest on the ground and prevent gear 23 from assuming a driving position with respect to hopper assembly 10 until the equipment has been moved far enough to take these elements into the ground. By making connection 29 flexible, according to the arrangement of the present invention, the manipulation of the supporting frame structure is still easily accomplished despite this circumstance, for connection 29 will merely slack when furrow opening elements 11 and 12 and earth working elements 17 reach the ground, and allow the driving connection between gear 23 and hopper assembly 10 to follow as these elements are taken into the ground with movement of the fertilizer distributor. Thus no attention to the lifting lever 30 is required while the driving connection is made as would be necessary if the usual rigid connection with a rack and pawl adjustment were used.

The hopper assembly 10 which as previously noted is adapted to feed fertilizer to the depositing legs 13 for deposit in the furrows opened by the elements 11 and 12 is illustrated in Figs. 3 to 8 inclusive. As illustrated, the assembly 10 comprises an open-bottom hopper including an upper supply containing portion 36 having a generally flared shape as shown, and a lower support portion 37. The lower support portion 37 is formed with mounting arms 38 which extend for attachment on support frame 14. This attachment is accommodated by the previously mentioned handle support brackets 32 and a second pair of suitably arranged support brackets 39 (see Figs. 1 and 2). The mounting arms 38 are received on support brackets 32 and 39 by means of bolts arranged as at 40, the mounting arms 38 being formed with open slots or notches 41 so that the lower support portion 38 may be easily disposed on and removed from the support frame 14. The lower support portion 38 is also formed with ears 42 adapted to provide a means for fixing the upper hopper portion 36 in place through screw fastenings as at 43.

As previously mentioned, the upper supply portion 36 and lower support portion 37 form an open-bottom hopper. To provide a bottom closure for the hopper arranged in this manner, a plate member is arranged as indicated at 44. The plate member 44 is carried on a separate support member 45 which is bolted directly to frame 14 as at 46. The support member 45 is formed with a central boss 47 and plate member 44 is provided with a central aperture adapted to fit over the boss 47 as shown. Immediately surrounding boss 47 plate member 45 extends horizontally to provide a bearing surface as at 48 adapted to maintain plate member 44 levelly disposed as a bottom closure for the hopper but providing plate member 44 with a rotatable mounting around boss 47 as a pivot point.

Beyond the bearing surface 48 support member 45 is formed to provide clearance for a downwardly extending circular flange 49 formed on plate member 44. The extending edge of this flange 49 is worked with gear teeth as at 50 so as to form a ring gear. The flange 49 and gear teeth 50 formed in this manner are disposed in relation to gear 23 carried by axle 21 and when gear 23 is presented for driving connection with hopper assembly 10 by manipulation of the support frame structure as previously described, gear 23 will engage gear teeth 50 on flange 49 so that plate member 44 will be rotated during operation of the fertilizer distributor.

This rotation of plate member 44 is effected to feed fertilizer from the hopper assembly 10. The feeding is accomplished through side wall openings 51 formed in the lower hopper support portion 37 (see Fig. 8). The plate member 44 is inclined downwardly away from its center as shown in the drawing, and with a supply of fertilizer in the hopper rotation of plate member 44 will obviously cause fertilizer to be fed through the side wall openings 51. Fertilizer issuing from openings 51 in this manner is received in a surrounding annular channel concentric with the hopper, formed by an upstanding peripheral flange 52 on plate member 44.

To regulate the rate at which fertilizer is fed from the hopper, a shiftable band member 53 is associated with the lower hopper support portion 37. The band member 53 fits the support portion 37 exteriorly over the side wall openings 52 and is attached by screw fastenings as at 54 engaging support portion 37 and extending through slots 55 in the band 53 so that it may be shifted on support portion 37 for the extent of slots 55, the band member 53 being provided with extending pins 56 to provide an easy means for accomplishing the shifting. Band member 53 is further formed with notched portions 57 (see Fig. 9) which correspond in extent with the side wall openings 51 in hopper support portion 37.

This arrangement makes it possible to adjust the position of band member 53 on hopper support portion 37 so that the notches 57 may be disposed to uncover the side wall openings 51 in any desired degree and thus regulate the rate at which fertilizer is fed through the side wall openings 51. The disposition of band member 53 for this purpose is readily adjusted to effect the rate of feeding, and at a given adjustment the band member 53 may be locked in relation to hopper support portion 37 by tightening up the screw fastenings 54. This method of regulating the rate of fertilizer distribution has given excellent results under actual test conditions particularly in the range of high feeding rates where substantial difficulty is normally encountered in obtaining proper regulation. With the arrangement of the present invention as just described we have found that the rate of feeding increases substantially as a straight line function of the extent to which side wall openings 51 are uncovered by shifting band member 53.

In order to distribute the fertilizer fed from the hopper to the depositing legs 13 for deposit in the furrows opened by furrow opening elements 11 and 12, deflecting members 58 are disposed to transfer fertilizer from the surrounding channel formed by peripheral flange 52 on plate member 44 to the depositing legs 13. These deflecting members 58 may be generally described as plow shaped elements (see Fig. 7), and they are pivoted on hopper support portion 37 as at 59 so that the plow shaped end is disposed to ride plate member 44 in the surrounding channel portion formed by flange 52. The deflecting elements 58 are further disposed in relation to the intake cup portions 60 of depositing legs 13 (see Fig. 2). As described above, plate member 44 rotates during operation of the fertilizer distributor to feed fertilizer to the channel portion inside flange 52, and as fertilizer accumulates in the channel portion it will be carried toward the deflecting elements 58, the faces of which are presented in a direction opposed to the direction of rotation of plate member 44 as indicated at 61. The fertilizer will accordingly be transferred from the channel portion by these deflecting faces 61 over the flange 52 into the intake cup portions 60 of depositing legs 13.

Figure 3:
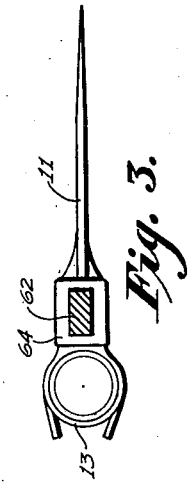
Fig. 3 is a detail in plan showing the disposition of the fertilizer depositing legs rearwardly of the furrow opening elements.

The depositing legs 13 are of well known spiral wrap construction rendering them adjustable for disposition in relation to the furrow opening elements 11 and 12. The furrow opening elements 11 and 12 may be of any convenient type. We have obtained good results with conventional sword plows which have the advantage of forming a furrow of uniform depth with resulting uniformity in the manner in which the fertilizer is deposited. The furrow opening elements 11 and 12 are carried from support frame 14 on support bars 62, and a bolt and slot adjustment as at 63 is provided for depth regulation. The depositing legs 13 are disposed at their lower end rearwardly of the furrow opening elements 11 and 12, the mounting portion 64 of each of the elements 11 and 12 being adapted to receive the depositing legs as illustrated in Fig. 3.

An important feature of the arrangement of the furrow opening elements 11 and 12 and depositing legs 13 is their diagonal disposition with respect to the hopper assembly or dispensing unit 10 (see Figs. 1 and 2). With the usual side by side arrangement of furrow openers in equipment of this type, considerable trouble is encountered due to clogging of the opener elements with trash and the like which normally accumulates on farm land. By arranging the furrow opening elements 11 and 12, as shown in the drawing, with a diagonal as well as transverse spacing, this difficulty is eliminated because the trash cannot lodge between the diagonally disposed openers 11 and 12. Moreover, this diagonal disposition has the further advantage of maintaining the total quantity of fertilizer metered from the dispensing unit 10 constant regardless of tilting of the machine during operation, such as would occur when rough or unlevel ground was being worked. When tilting occurs, one band of the fertilizer deposited may be heavier than the other, but the total quantity deposited will remain substantially even, because of the diagonal arrangement of the openers 11 and 12 and associated depositing legs 13, and it has been found that variations in quantity between the bands apparently has little effect on plant yield as long as the total quantity of fertilizer deposited is substantially uniform.

Following opening of the spaced furrows and deposit of the fertilizer in these furrows as just described, the furrows are closed by the previously mentioned earth working elements 17 which are disposed rearwardly from support frame 14. These earth working elements 17 suitably consist of conventional disk members as illustrated, and in addition to covering the furrows formed by opening elements 11 and 12 they may perform the further function of throwing soil inwardly for a subsequent planting operation when desired. A cross bar 65 is carried transversely by support frame 14 to provide a mounting for earth working elements 17.

To render the mounting of elements 17 on cross bar 65 adjustable in relation to opening elements 11 and 12, an adjustable securing means is provided as indicated at 66. This securing means 66 engages the support rod 67 carrying the elements 17 so that these elements may be adjusted as to depth, shifted transversely, and fixed angularly in accordance with the particular earth working conditions encountered. The securing means 66 is illustrated more in detail in Figs. 10, 11 and 12, and comprises a body block 68 in which yoke members 69 are fixed to extend above and below cross bar 65 around the support rods 67 of element 17, and an intermediate bearing block 70 having a recessed face adapted to the configuration of support rods 67 is also provided as for inner engagement with support rod 67. A stud screw 71 is centrally located in body block 68 and is arranged so that it may be screwed down in engagement with cross bar 65.

When assembled the support rods 67 are received through yoke members 69 with intermediate bearing block 70 interposed between the support rod 67 and cross bar 65, and stud screw 71 is then tightened down to grip the support rod 67 between yoke members 69 and intermediate bearing blocks 70. With this arrangement the earth working elements 17 can be securely positioned as desired, and it will be noted that the positioning can be effected by adjustment at only one point; that is, the entire adjustment is controlled through stud screw 71 and can be easily accomplished without the necessity for dealing with a number of points of fastening as is usually the case in mountings of this type.

As noted above, a coupling means 19 is provided at the rear end of support frame 14 for attaching a planter unit to the fertilizer distributor of the present invention when it is desired to use these units in combination. Any suitable planter unit may be used in this event, and a number of types are well known and commonly available. The disposition of a planter unit coupled to the fertilizer distributor of the present invention is indicated generally in Figs. 1 and 2 as at 72. As shown, the planter 72 incorporates the elements usually common in units of this type. A seed hopper is shown at 73 carried on a frame 74, and a furrow opener 75 is disposed from frame 74 centrally below hopper 73. Rearwardly of frame 74, packing wheels 76 are arranged in the usual manner to form a support for the planter unit 72, and also cover the seed furrow and pack the covering earth. With movement of planter unit 72, opener 75 will prepare a seed furrow in which seeds will be deposited by means of a suitable distributing mechanism (not shown) operating in hopper 73, the distributing mechanism being operated through a driving connection from packing wheels 76 as at 77.

The coupling means 19 for attaching the planter unit 72 comprises essentially a hinge assembly of which one element consists of a bracket 78 mounted at the rear end of support frame 14, and formed with upper and lower extending arms terminating in tubular elements 79 and 80 adapted to receive a hinge pin 81. The hinge structure is completed by a tubular portion 82 formed at the extending end of an arm 83 arranged from frame 74 of the planter unit 72. The tubular portion 82 of arm 83 is proportioned to fit between the extending tubular elements 79 and 80 of bracket 78 and be assembled in hinge relation to these elements on pin 81.

It will also be noted that the tubular portion 82 of arm 83 and the tubular elements 79 and 80 of bracket 78 are disposed so as to orient the longitudinal axis of pin 81 with an inclination off of vertical. This arrangement of the pivot axis of coupling means 19 disposes the planter unit and fertilizer distributor so that they tend to travel in line, because any pivoting of the units at the coupling means 19 causes the frame members to rise at this point; and as a substantial portion of the weight of the unit is placed on coupling means 19 due to the relative positions of wheels 20 and packing wheels 76, this result is normally opposed. But when the fertilizer distributor is directed in a curved path, such as in planting terraces or on the contour, pivoting will take place at coupling means 19 if the pivot axis is oriented with a proper inclination. We have found that an inclination of about 12° off of vertical gives very satisfactory results. By providing for pivoting in this manner it is possible to maintain the path of operation of the planter substantially centrally disposed with respect to the spaced band of fertilizer deposited by the fertilizer distributor despite the curved path of travel.

The fertilizer distributor of the present invention may otherwise be used separately if desired. It may be very advantageously employed in this manner for example in connection with transplanting operations to fertilize the bed before setting out the planting. When used for this purpose a marking pin (not shown) may be arranged in the tubular elements 79 and 80 of bracket 78 to mark the planting row in relation to the fertilizer bands deposited.

We claim:

1. In a fertilizer distributor including a supporting frame structure, and spaced depositing legs disposed on said frame structure: a hopper assembly carried by said frame structure for distributing fertilizer to said depositing legs comprising an open-bottomed hopper having adjustable side-wall openings adjacent its lower end, a rotatable plate member adapted as a bottom closure for said hopper, said plate member being inclined downwardly from its center uniformly in all directions toward its periphery and having an upstanding peripheral flange concentrically spaced with respect to the lower end of said hopper to form a surrounding channel, means for rotating said plate member to feed fertilizer from said hopper through said adjustable side-wall openings into said channel, and deflecting members disposed to transfer fertilizer from said channel to said depositing legs.

2. In a fertilizer distributor including depositing legs arranged in spaced relation: a hopper assembly for distributing fertilizer to said depositing legs comprising an open-bottom hopper having adjustable side-wall openings adjacent its lower end, a rotatable plate member adapted as a bottom closure for said hopper, said plate member being inclined downwardly from its center in all directions toward its periphery and having an upstanding peripheral flange concentrically spaced with respect to the lower end of said hopper to form a surrounding channel, a support frame carrying said hopper, said plate member, and said depositing legs in association, running gear for said fertilizer distributor and a running gear frame pivotally connected to said support frame, means associated with said running gear for rotating said plate member to feed fertilizer from said hopper through said adjustable side-wall openings into said surrounding channel, deflecting members disposed to transfer fertilizer from said channel to said depositing legs, and means for pivoting said running gear frame with respect to said support frame to engage and disengage said rotating means with said plate member at will.

3. A fertilizer distributor comprising an open-bottom hopper having adjustable side-wall openings adjacent its lower end, said side-wall openings being rendered adjustable by a band member disposed on said hopper in fixed vertical relation but shiftable circumferentially in covering relation with respect to said side-wall openings, said band member being formed with notches corresponding in extent with said side-wall openings, whereby upon shifting of said band member said side-wall openings may be uncovered at a selected adjusted horizontal width while maintaining a constant vertical extent, a plate member adapted as a bottom closure for said hopper, said plate member being inclined downwardly from its center uniformly in all directions toward its periphery having a flange portion provided with a ring gear, a support frame carrying said hopper and said plate member in association, running gear for said fertilizer distributor and a running gear frame pivotally connected to said support frame, a gear element associated with said running gear for driving engagement with the ring gear portion of said plate member to rotate said plate member and thereby feed fertilizer from said hopper through said adjustable side-wall openings, and means for pivoting said running gear frame with respect to said support frame to engage and disengage said gear element with said plate member at will.

4. A fertilizer distributor comprising a supporting frame structure, a hopper mounted on said frame structure, a plate member rotatably carried by said frame structure and disposed as a bottom closure for said hopper, said plate member being inclined downwardly from its center uniformly in all directions toward its periphery, side wall openings formed in said hopper adjacent said plate member, and a band member disposed circumferentially on said hopper, and said band member being formed with notches corresponding in extent with said side wall openings, whereby upon shifting of said band member said side wall openings may be uncovered for a selected horizontal width while maintaining a constant vertical extent.

5. A fertilizer distributor comprising an open-bottom hopper having adjustable side-wall openings adjacent its lower end, said side wall openings being rendered adjustable by a band member disposed on said hopper in fixed vertical relation but shiftable circumferentially in covering relation with respect to said side wall openings, said band member being formed with notches corresponding in extent with said side wall openings, whereby upon shifting of said band member said side wall openings may be uncovered for a selected horizontal width while maintaining a constant vertical extent, a plate member adapted as a bottom closure for said hopper, said plate member being inclined downwardly from its center uniformly in all directions toward its periphery, a supporting frame member carrying said hopper and plate member in association, and means for rotating said plate member to feed fertilizer from said hopper through said adjustable side-wall openings.

6. A fertilizer distributor as defined in claim 5 in that the means for rotating said plate member comprises a flange portion at the periphery of said plate member having its lower edge shaped to form a ring gear, running gear for said fertilizer distributor and a running gear frame pivotally connected to said supporting frame, a gear element associated with said running gear for driving engagement with said ring gear at the flange portion of said plate member, and means for pivoting said running gear frame with respect to said support frame to engage and disengage said gear element with said plate element at will.

GEORGE W. GILES.
RASSIE E. WICKER.

REFERENCES CITED

The following references are of record in the file of this patent:

UNITED STATES PATENTS

| Number | Name | Date |
|---|---|---|
| 362,943 | Daniels | May 17, 1887 |
| 592,774 | Frazier | Nov. 2, 1897 |
| 801,139 | Eisenhart | Oct. 3, 1905 |
| 911,816 | Gielow | Feb. 9, 1909 |
| 1,107,992 | Parrish | Aug. 18, 1914 |
| 1,124,503 | Moyle | Jan. 12, 1915 |
| 1,770,641 | Brennan | July 15, 1930 |
| 1,801,980 | Robinson et al. | Apr. 21, 1931 |
| 1,964,176 | Root | June 26, 1934 |
| 2,042,014 | Michael et al. | May 26, 1936 |
| 2,309,353 | Paden | Jan. 26, 1943 |

FOREIGN PATENTS

| Number | Country | Date |
|---|---|---|
| 313,601 | Italy | Dec. 30, 1933 |